(12) United States Patent
Schnidrig (10) Patent No.: US 10,885,184 B1
(45) Date of Patent: Jan. 5, 2021

(54) REARRANGING EXECUTABLES IN MEMORY TO PREVENT ROP ATTACKS

(71) Applicant: McAfee, LLC, Santa Clara, CA (US)

(72) Inventor: Matias Schnidrig, Cordoba (AR)

(73) Assignee: McAfee, LLC, San Jose, CA (US)

( * ) Notice: Subject to any disclaimer, the term of this patent is extended or adjusted under 35 U.S.C. 154(b) by 84 days.

(21) Appl. No.: 15/923,953

(22) Filed: Mar. 16, 2018

Related U.S. Application Data (60) Provisional application No. 62/472,279, filed on Mar. 16, 2017.

(51) Int. Cl.
    *G06F 11/00* (2006.01)
    *G06F 21/54* (2013.01)
    *G06F 9/445* (2018.01)
    *G06F 21/56* (2013.01)

(52) U.S. Cl.
    CPC .......... *G06F 21/54* (2013.01); *G06F 9/44521* (2013.01); *G06F 21/566* (2013.01); *G06F 2221/033* (2013.01)

(58) Field of Classification Search
    CPC .. G06F 21/54; G06F 21/566; G06F 2221/033; G06F 21/56; H04L 29/06911
    See application file for complete search history.

(56) References Cited

U.S. PATENT DOCUMENTS

| 9,250,937 | B1* | 2/2016 | Franz | G06F 9/45516 |
| 2015/0047049 | A1* | 2/2015 | Panchenko | G06F 21/54 726/26 |
| 2015/0106872 | A1* | 4/2015 | Hiser | G06F 21/56 726/1 |
| 2015/0135313 | A1* | 5/2015 | Wesie | G06F 9/44568 726/22 |
| 2016/0092675 | A1* | 3/2016 | Vidrine | G06F 12/0284 726/22 |
| 2017/0213039 | A1* | 7/2017 | Werner | G06F 21/53 |
| 2018/0082056 | A1* | 3/2018 | Farchi | G06F 21/54 |
| 2018/0232518 | A1* | 8/2018 | Copty | G06F 21/52 |

OTHER PUBLICATIONS

Zhan, X., Zheng, T., & Gao, S. (2014). Defending ROP attacks using basic block level randomization doi:http://dx.doi.org/10.1109/SERE-C.2014.28 (Year: 2014).*

Gupta A., Kerr S., Kirkpatrick M.S., Bertino E. (2013) Marlin: A Fine Grained Randomization Approach to Defend against ROP Attacks. In: Lopez J., Huang X., Sandhu R. (eds) Network and System Security. NSS 2013. Lecture Notes in Computer Science, vol. 7873. Springer, Berlin, Heidelberg (Year: 2013).*

Davi, L., Dmitrienko, A., Nurnberger, S., Sadeghi, A.R.: Xifer: A software diversity tool against code-reuse attacks. In: 4th ACM International Workshop on Wireless of the Students, by the Students, for the Students (S3 2012) (Aug. 2012) (Year: 2012).*

\* cited by examiner

*Primary Examiner* — Samson B Lemma
(74) *Attorney, Agent, or Firm* — Byrne Poh LLP (57) ABSTRACT

Methods, systems, and media for protecting against return-oriented programming malware are provided. In some embodiments, the method comprises: retrieving an executable module; identifying a basic block in the executable module located at a first memory location, wherein the basic block has one entry point and one exit point; moving a portion of the executable module that corresponds to the basic block to a random memory location from the first memory location; and replacing a destination of a function call to the basic block within the executable module with a representation of the random memory location.

15 Claims, 4 Drawing Sheets

REARRANGING EXECUTABLES IN MEMORY TO PREVENT ROP ATTACKS

CROSS-REFERENCE TO RELATED APPLICATION

This application claims the benefit of U.S. Provisional Patent Application No. 62/472,279, filed on Mar. 16, 2017, which is hereby incorporated by reference herein in its entirety.

TECHNICAL FIELD

Embodiments described herein generally relate to computer security, and in particular to techniques for preventing return-oriented programming attacks by malware.

BACKGROUND

Return and jump oriented programming (ROP/JOP) exploits are a growing threat for software applications. These techniques allow an attacker to execute code even if security measures such as non-executable memory and code signing are used. In an ROP attack, an attacker gains control of the call stack and then executes carefully chosen machine instruction sequences, called "gadgets." Each gadget typically ends in a return instruction and is code within an existing program (or library). Chained together via a sequence of carefully crafted return addresses, these gadgets allow an attacker to perform arbitrary operations. JOP attacks do not depend upon the stack for control flow, but use a dispatcher gadget to take the role of executing functional gadgets that perform primitive operations.

Detection of ROP exploits is complicated due to the nature of the attack. A number of techniques have been proposed to subvert attacks based on return-oriented programming.

The first approach is randomizing the location of program and library code, so that an attacker cannot accurately predict the location of usable gadgets. Address space layout randomization (ASLR) is an example of this approach. Unfortunately, ASLR is vulnerable to information leakage attacks and once the code location is inferred, a return-oriented programming attack can still be constructed. Randomization approach can be taken further by employing relocation at runtime. This complicates the process of finding gadgets but incurs significant overhead.

But at the moment, randomization solutions are based in randomizing the start address of the whole executable block. In that situation, there are multiple ways of computing the random offset and then executing small portions of the code to obtain the expected result.

A second approach modifies the operating system with compiler support to track that return instructions divert control flow back to a location immediately following a call instruction. This prevents gadget chaining, but carries a heavy performance penalty. In addition, it is possible to mount JOP attacks without using return instructions at all, by using JMP instructions.

In a third approach, some Intrusion Protection Systems (IPSs) invalidate memory pages of a process except one currently executed page. Most regular jumps land within the same page. Passing control flow to a different page causes an exception that allows the IPS to check the control flow. This technique may also introduce a noticeable overhead.

Better approaches to both ROP and JOP attacks that do not incur large performance penalties are desirable.

SUMMARY

Methods, systems, and media for protecting against return-oriented programming malware are provided. In accordance with some embodiments of the disclosed subject matter, a method for protecting against return-oriented programming malware is provided, the method comprising: retrieving an executable module; identifying a basic block in the executable module located at a first memory location, wherein the basic block has one entry point and one exit point; moving a portion of the executable module that corresponds to the basic block to a random memory location from the first memory location; and replacing a destination of a function call to the basic block within the executable module with a representation of the random memory location.

In accordance with some embodiments of the disclosed subject matter, a system for protecting against return-oriented programming malware is provided, the system comprising: a memory; and a hardware processor coupled to the memory that is configured to: retrieve an executable module; identify a basic block in the executable module located at a first memory location, wherein the basic block has one entry point and one exit point; move a portion of the executable module that corresponds to the basic block to a random memory location from the first memory location; and replace a destination of a function call to the basic block within the executable module with a representation of the random memory location.

In accordance with some embodiments of the disclosed subject matter, a non-transitory computer-readable medium containing computer executable instructions that, when executed by a processor, cause the processor to perform a method for protecting against return-oriented programming malware, the method comprising: retrieving an executable module; identifying a basic block in the executable module located at a first memory location, wherein the basic block has one entry point and one exit point; moving a portion of the executable module that corresponds to the basic block to a random memory location from the first memory location; and replacing a destination of a function call to the basic block within the executable module with a representation of the random memory location.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

Over the past few years, code reuse exploit attacks such as ROP attacks have become popular as ROP attacks allows bypassing mitigation techniques such as Data Execution Prevention (DEP). ROP attacks and its variants JOP attacks and Call oriented programming (COP) attacks are code-reuse attacks, where existing code snippets called gadgets (ending with a RET/JUMP/CALL instruction) are chained together to construct malicious computations. In the discussion below, ROP attacks are used as representative of ROP, JOP, COP, and other variants of ROP attacks.

To prevent the attackers from knowing the addresses of gadgets needed for a ROP attack, modern software may employ an ASLR (Address Space Layout Randomization) mitigation technique. Unfortunately, ASLR can often be bypassed via various address discovery techniques. ROP exploits also have demonstrated various successful bypass techniques against API hooking-based caller validation, which are currently employed with Microsoft's Enhanced Mitigation Experience Toolkit (EMET) and McAfee's Host Intrusion Prevention System (HIPS). As of today, no reliable defense exists for ROP malware attacks.

Tools such as Binary Translation/Instrumentation (BT) provide fine grain instruction level behavioral monitoring and have proven to be a highly accurate method for detecting ROP malware. However, despite high detection efficacy with minimum false positives for ROP exploits, BT methods are prone to creating significant runtime overheads (10-15% performance impact) during monitoring.

Other anti-ROP attack methods may make use of one or more processor hardware features, such as Last Branch Record (LBR), Performance Monitoring Unit (PMU), processor trace (PT), and dedicated ROP heuristic detection hardware, such as hardware that attempts to detect ROP malware through detection of an RET-CALL imbalance. These approaches are hardware based and have low overhead. They may signal to anti-malware software about situations that look like ROP attacks: suspicious branching, RET-CALL biases, rate of branch or return mispredicts, etc. Their challenges lie in 1) the need for additional software analysis to make a final accurate decision (to reduce false positive rate), and 2) a possibility of malware escape and evasions when the threshold of hardware events is set too high.

The techniques disclosed below take a different approach to addressing the problem of ROP attacks, by going beyond ASLR-like approaches that randomize the start of the entire executable, and randomizing the location of individual functional blocks in the executable.

When loading a binary file into memory (process or library) the binary instructions are modified to reorder the execution. In that way, the process will know where the function and method begins but the location of the following instructions will be random. In the case of static jumps and calls, these addresses may be replaced by equivalent new random locations. In the case of dynamic jumps and calls one or more functions may be provided to convert from the previous location to the new random one.

By randomizing the flow for each function or method, an attacker cannot guess or compute where the instructions are, just the beginning of the function, and thus cannot execute the instructions necessary to produce the expected result. On the other hand, legitimate processes are able to call the function and may use it the same way without knowing that the execution flow was re-routed.

Figure 1:
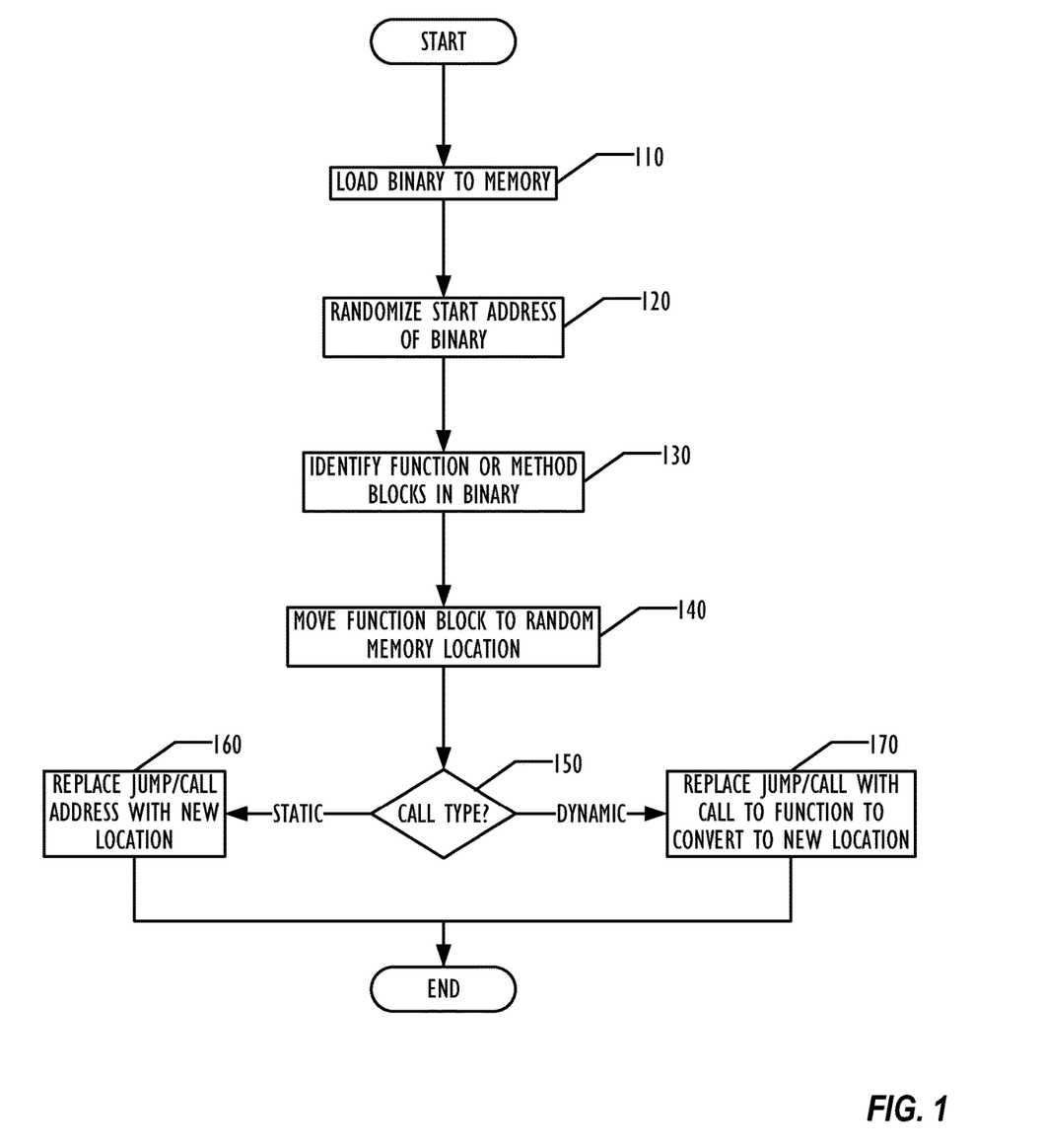
FIG. 1 is an example of a flowchart illustrating a technique for rearranging modules in memory according to some embodiments.

FIG. 1 is an example of a flowchart illustrating a technique for randomization according to some embodiments. In block 110, an executable module is loaded into memory. In block 120, ASLR or other similar techniques may be used to randomize the starting location of the module, using conventional techniques.

In block 130, the control flow of the binary code is analyzed to identify basic blocks in the code that are the destination of function calls. A basic block is a code sequence with no branches in except to the entry and no branches out except at the exit. Internal branches may exist in the basic block, but no branches from outside the block exist except at the entry point to the basic block. Compilers frequently decompose programs into basic blocks as part of analyzing the software to be compiled. But similar analysis can be performed in executable binary code, for example by scanning the executable for jump or call instructions and return instructions. In an ROP attack, these blocks become the gadgets for the ROP attack, by being called in ways that the executable did not expect. In addition to defining the basic blocks, the analysis determines the locations of jumps or calls to the basic block.

In block 140, the basic blocks that represent functions or methods may be moved to random memory locations. In block 150, the type of call or jump to the basic block is determined. If the call or jump is a static call or jump, then in block 160 the destination of the jump or call may be replaced with the newly randomized address of the basic block. If the call or jump is dynamic, meaning that address of the call or jump is calculated at runtime, such as loading the address from a call table, the call or jump may be replaced in block 170 by a call to a function that evaluates the dynamic call or jump, determines the resulting original address, then replaces the destination address with the newly randomized address of the basic block being called. For example, in some embodiments, the replacement function can determine which basic block is the destination of the dynamic call or jump. In one embodiment, a lookup table may be employed by the dynamic jump or call functions.

By performing this functional randomization at the point of loading the executable, there is a minor performance hit caused by the analysis of FIG. 1, but once that analysis has been performed, there is no performance degradation for static jumps or calls and only a very small performance degradation caused by runtime execution of the function used to determine the destination of dynamic jumps or call.

In one embodiment, the rearrangement of the basic blocks may be limited in a way that keeps the randomized address for the basic block on the same page as the original location. In another embodiment, the rearrangement of the basic blocks may allow rearrangement to a different page, but only to a page that is close to the original location, using any desired technique for determining an acceptable level of closeness. These limitations may avoid any problems with caching or any other situation where moving the basic block to a different page or a faraway page might degrade performance.

In some embodiments, the randomization of basic blocks may ignore the code of the main program, but only be applied to routines loaded from routine libraries, reducing the performance cost of the initial analysis and randomization.

In one embodiment, the randomization of the function address may be achieved by simply inserting random numbers of No Operation (NOP) instructions into the code at the entry point to move the entire basic block to a different location. For dynamic jumps and calls, the function employed in block 170 may then use a lookup table that stores just the number of NOPs in the lookup table.

By randomizing the location of basic blocks in the executable, ROP attacks will be unable to know where the functions that are intended to be used as ROP gadgets will be located in memory, making ROP attacks much more difficult without some of the performance overhead of previous attempts to prevent ROP attacks.

Figure 2:
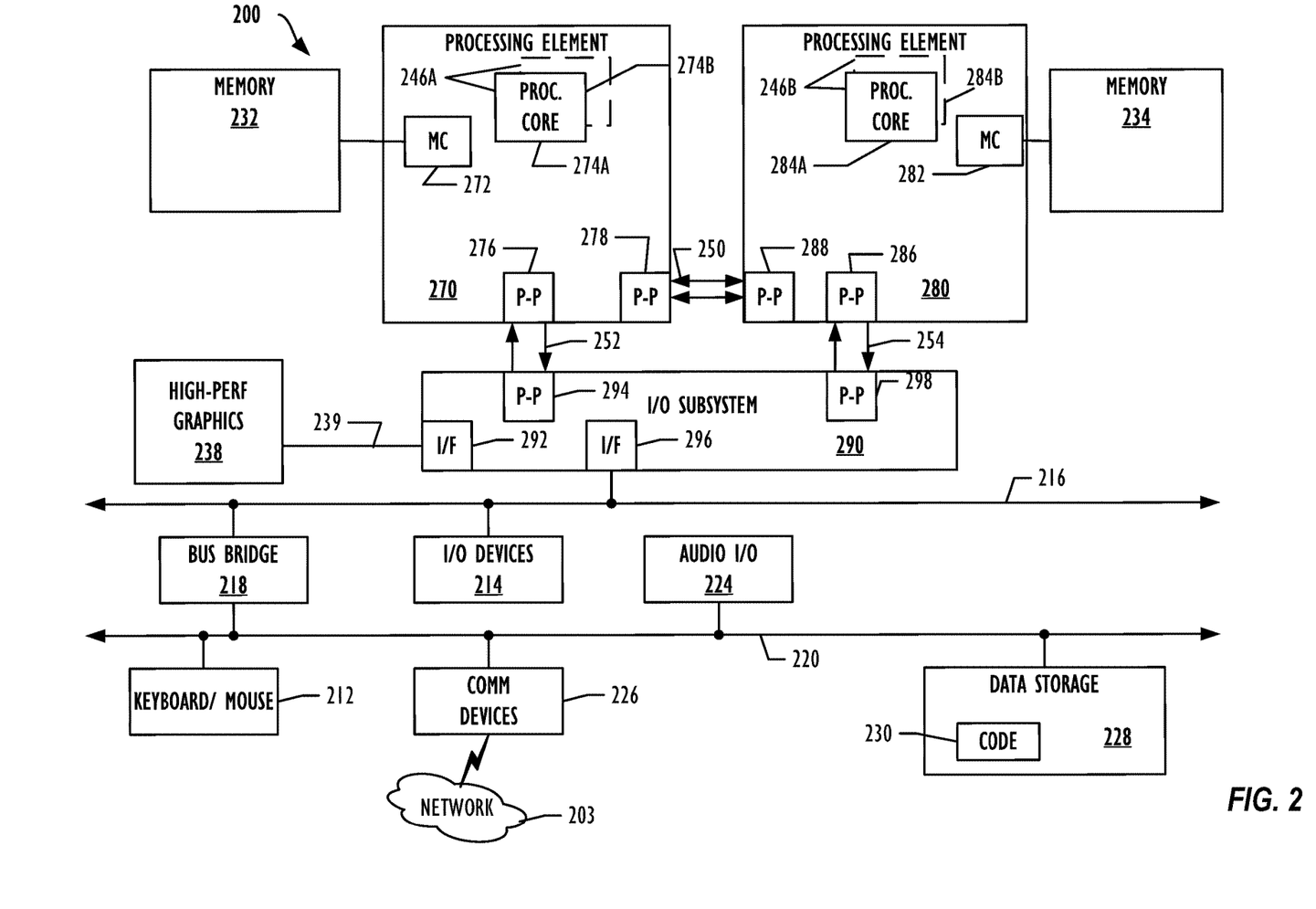
FIGS. 2 and 3 are examples of block diagrams illustrating a computing device for use with techniques described herein according to some embodiments.

Referring now to FIG. 2, an example of a block diagram illustrates a programmable device 200 that may be used for implementing the techniques described herein in accordance with some embodiments. The programmable device 200 illustrated in FIG. 2 is a multiprocessor programmable device that includes a first processing element 270 and a second processing element 280. While two processing elements 270 and 280 are shown, an embodiment of programmable device 200 may also include only one such processing element.

Programmable device 200 is illustrated as a point-to-point interconnect system, in which the first processing element 270 and second processing element 280 are coupled via a point-to-point interconnect 250. Any or all of the interconnects illustrated in FIG. 2 may be implemented as a multidrop bus rather than point-to-point interconnects.

As illustrated in FIG. 2, each of processing elements 270 and 280 may be multicore processors, including first and second processor cores (i.e., processor cores 274a and 274b and processor cores 284a and 284b). Such cores 274a, 274b, 284a, 284b may be configured to execute instruction code. However, other embodiments may use processing elements that are single core processors as desired. In embodiments with multiple processing elements 270, 280, each processing element may be implemented with different numbers of cores as desired.

Each processing element 270, 280 may include at least one shared cache 246. The shared cache 246a, 246b may store data (e.g., instructions) that are utilized by one or more components of the processing element, such as the cores 274a, 274b and 284a, 284b, respectively. For example, the shared cache may locally cache data stored in a memory 232, 234 for faster access by components of the processing elements 270, 280. In one or more embodiments, the shared cache 246a, 246b may include one or more mid-level caches, such as level 2 (L2), level 3 (L3), level 4 (L4), or other levels of cache, a last level cache (LLC), or combinations thereof.

While FIG. 2 illustrates a programmable device with two processing elements 270, 280 for clarity of the drawing, the scope of the present invention is not so limited and any number of processing elements may be present. Alternatively, one or more of processing elements 270, 280 may be an element other than a processor, such as a graphics processing unit (GPU), a digital signal processing (DSP) unit, a field programmable gate array, or any other programmable processing element. Processing element 280 may be heterogeneous or asymmetric to processing element 270. There may be a variety of differences between processing elements 270, 280 in terms of a spectrum of metrics of merit including architectural, microarchitectural, thermal, power consumption characteristics, and the like. These differences may effectively manifest themselves as asymmetry and heterogeneity amongst processing elements 270, 280. In some embodiments, the various processing elements 270, 280 may reside in the same die package.

First processing element 270 may further include memory controller logic (MC) 272 and point-to-point (P-P) interconnects 276 and 278. Similarly, second processing element 280 may include a MC 282 and P-P interconnects 286 and 288. As illustrated in FIG. 2, MCs 272 and 282 couple processing elements 270, 280 to respective memories, namely a memory 232 and a memory 234, which may be portions of main memory locally attached to the respective processors. While MC logic 272 and 282 are illustrated as integrated into processing elements 270, 280, in some embodiments the memory controller logic may be discrete logic outside processing elements 270, 280 rather than integrated therein.

Processing element 270 and processing element 280 may be coupled to an I/O subsystem 290 via respective P-P interconnects 276 and 286 through links 252 and 254. As illustrated in FIG. 2, I/O subsystem 290 includes P-P interconnects 294 and 298. Furthermore, I/O subsystem 290 includes an interface 292 to couple I/O subsystem 290 with a high performance graphics engine 238. In one embodiment, a bus (not shown) may be used to couple graphics engine 238 to I/O subsystem 290. Alternately, a point-to-point interconnect 239 may couple these components.

In turn, I/O subsystem 290 may be coupled to a first link 216 via an interface 296. In one embodiment, first link 216 may be a Peripheral Component Interconnect (PCI) bus, or a bus such as a PCI Express bus or another I/O interconnect bus, although the scope of the present invention is not so limited.

As illustrated in FIG. 2, various I/O devices 214, 224 may be coupled to first link 216, along with a bridge 218 that may couple first link 216 to a second link 220. In one embodiment, second link 220 may be a low pin count (LPC) bus. Various devices may be coupled to second link 220 including, for example, a keyboard/mouse 212, communication device(s) 226 (which may in turn be in communication with the computer network 203), and a data storage unit 228 such as a disk drive or other mass storage device which may include code 230, in some embodiments. The code 230 may include instructions for performing embodiments of one or more of the techniques described above. Further, an audio I/O 224 may be coupled to second link 220.

Note that other embodiments are contemplated. For example, instead of the point-to-point architecture of FIG. 2, a system may implement a multi-drop bus or another such communication topology. Although links 216 and 220 are illustrated as busses in FIG. 2, any desired type of link may be used. In addition, the elements of FIG. 2 may alternatively be partitioned using more or fewer integrated chips than illustrated in FIG. 2.

Figure 3:
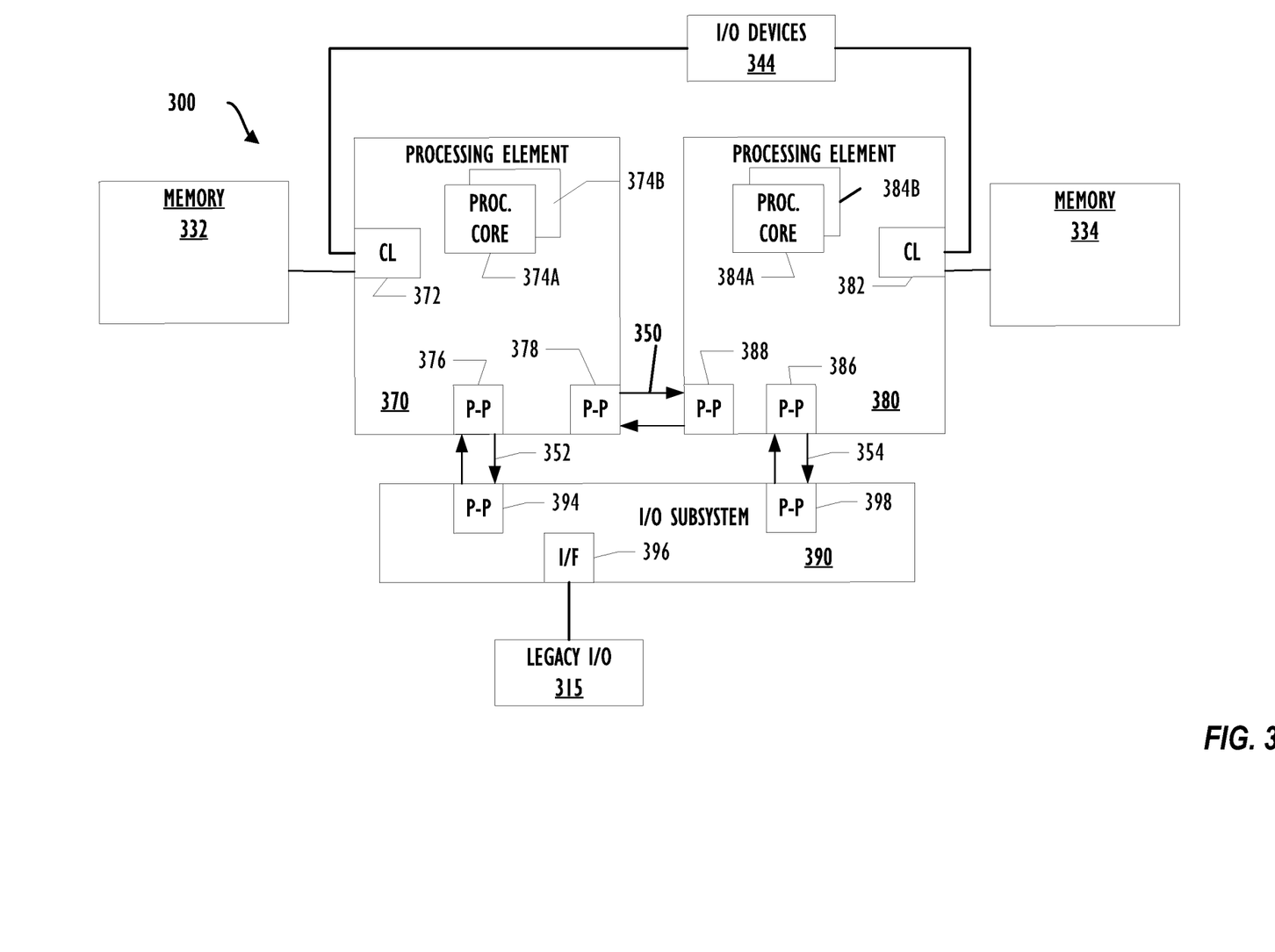

Referring now to FIG. 3, a block diagram illustrates a programmable device 300 according to some embodiments. Certain aspects of FIG. 3 have been omitted from FIG. 3 in order to avoid obscuring other aspects of FIG. 3.

In accordance with some embodiments, FIG. 3 illustrates an example of how processing elements 370, 380 may include integrated memory and I/O control logic ("CL") 372 and 382, respectively. In some embodiments, CL 372, 382 may include memory control logic (MC) such as that described above in connection with FIG. 2. In addition, CL 372, 382 may also include I/O control logic. FIG. 3 illustrates that not only may the memories 332, 334 be coupled to the CL 372, 382, but also that I/O devices 344 may also be coupled to the control logic 372, 382. Legacy I/O devices 315 may be coupled to the I/O subsystem 390 by interface 396. Each processing element 370, 380 may include multiple processor cores, illustrated in FIG. 3 as processor cores 374A, 374B, 384A and 384B. As illustrated in FIG. 3, I/O subsystem 390 includes point-to-point (P-P) interconnects 394 and 398 that connect to P-P interconnects 376 and 386 of the processing elements 370 and 380 with links 352 and 354. Processing elements 370 and 380 may also be interconnected by link 350 and interconnects 378 and 388, respectively.

The programmable devices depicted in FIGS. 2 and 3 are schematic illustrations of embodiments of programmable devices that may be utilized to implement various embodiments discussed herein. Various components of the programmable devices depicted in FIGS. 2 and 3 may be combined in a system-on-a-chip (SoC) architecture.

Figure 4:
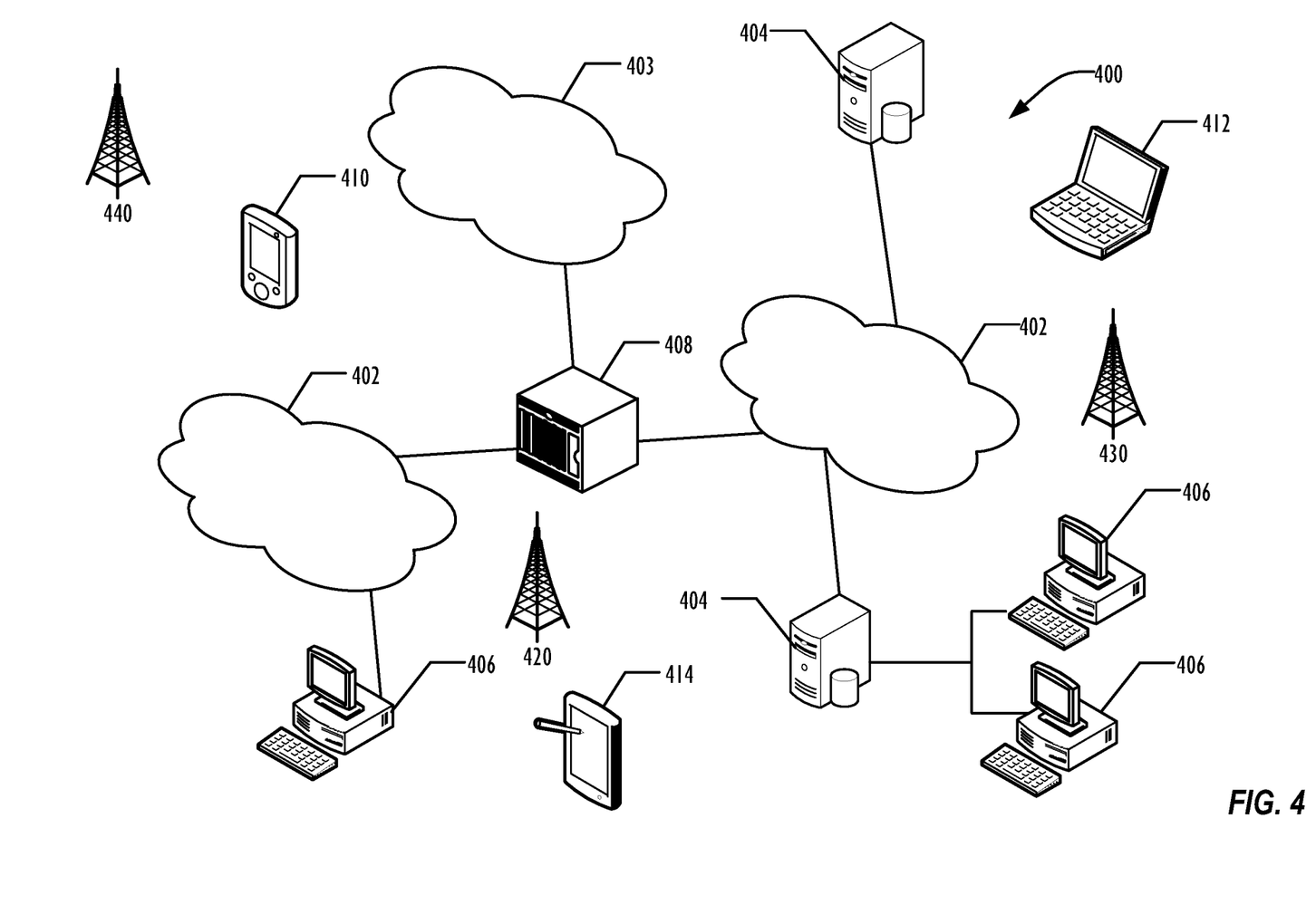
FIG. 4 is an example of a block diagram illustrating a network of programmable devices that may be used as an infrastructure according to some embodiments.

Referring now to FIG. 4, an example infrastructure 400 in which the techniques described above may be implemented is illustrated schematically in accordance with some embodiments. Infrastructure 400 contains computer networks 402. Computer networks 402 may include many different types of computer networks available today, such as the Internet, a corporate network or a Local Area Network (LAN). Each of these networks can contain wired or wireless programmable devices and operate using any number of network protocols (e.g., TCP/IP). Networks 402 may be connected to gateways and routers (represented by 408), end user computers 406, and computer servers 404. Infrastructure 400 also includes cellular network 403 for use with mobile communication devices. Mobile cellular networks support mobile phones and many other types of mobile devices. Mobile devices in the infrastructure 400 are illustrated as mobile phones 410, laptops 412 and tablets 414. A mobile device such as mobile phone 410 may interact with one or more mobile provider networks as the mobile device moves, typically interacting with a plurality of mobile network towers 420, 430, and 440 for connecting to the cellular network 403. Although referred to as a cellular network in FIG. 4, a mobile device may interact with towers of more than one provider network, as well as with multiple non-cellular devices such as wireless access points and routers 408. In addition, the mobile devices 410, 412 and 414 may interact with non-mobile devices such as computers 404 and 406 for desired services.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), non-transitory forms of magnetic disk storage media (such as hard disks, floppy disks, and/or any other suitable magnetic media), non-transitory forms of optical storage media (such as compact discs, digital video discs, Blu-ray discs, and/or any other suitable optical media), flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a standalone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method for protecting against return-oriented programming malware, comprising:
    retrieving an executable module;
    identifying a first basic block in the executable module located at a first memory location, wherein the first basic block is a code sequence with no branches in except one entry point and with no branches out except one exit point, using a hardware processor;
    determining whether the first basic block is associated with a main program or a library;
    in response to determining that the first basic block is associated with a library:
        moving a first portion of the executable module that corresponds to the first basic block to a random memory location from the first memory location; and
        replacing a destination of a first function call to the first basic block within the executable module with a representation of the random memory location by replacing the first function call to the first basic block with a second function call, wherein the first function call is a dynamic call, and wherein the second function call identifies the random memory location;
    identifying a second basic block in the executable module located at a second memory location, wherein the second basic block has one entry point and one exit point;
    determining whether the second basic block is associated with the main program or a library; and
    in response to determining that the second basic block is associated with the main program:
        leaving a second portion of the executable module that corresponds to the second basic block at the second memory location.

2. The method of claim 1, wherein the first memory location and the random memory location are in a same page.

3. The method of claim 1, further comprising determining whether the first function call to the first basic block is a static call or a dynamic call.

4. The method of claim 3, wherein the first function call is a static call, and wherein the representation of the random memory location is an indication of the random memory location.

5. The method of claim 1, wherein moving the first portion of the executable module that corresponds to the first basic block to the random memory location comprises inserting a random number of No Operation instructions in the executable module at the one entry point.

6. A system for protecting against return-oriented programming malware, the system comprising:
    a memory; and
    a hardware processor coupled to the memory that is configured to:
        retrieve an executable module;
        identify a first basic block in the executable module located at a first memory location, wherein the first basic block is a code sequence with no branches in except one entry point and with no branches out except one exit point;
        determine whether the first basic block is associated with a main program or a library;
        in response to determining that the first basic block is associated with a library:
            move a first portion of the executable module that corresponds to the first basic block to a random memory location from the first memory location; and
            replace a destination of a first function call to the first basic block within the executable module with a representation of the random memory location by replacing the first function call to the first basic block with a second function call, wherein the first function call is a dynamic call, and wherein the second function call identifies the random memory location;
        identify a second basic block in the executable module located at a second memory location, wherein the second basic block has one entry point and one exit point;
        determine whether the second basic block is associated with the main program or a library; and
        in response to determining that the second basic block is associated with the main program:
            leave a second portion of the executable module that corresponds to the second basic block at the second memory location.

7. The system of claim 6, wherein the first memory location and the random memory location are in a same page.

8. The system of claim 6, wherein the hardware processor is further configured to determine whether the first function call to the first basic block is a static call or a dynamic call.

9. The system of claim 8, wherein the first function call is a static call, and wherein the representation of the random memory location is an indication of the random memory location.

10. The system of claim 6, wherein moving the first portion of the executable module that corresponds to the first basic block to the random memory location comprises inserting a random number of No Operation instructions in the executable module at the one entry point.

11. A non-transitory computer-readable medium containing computer executable instructions that, when executed by a processor, cause the processor to perform a method for protecting against return-oriented programming malware, the method comprising:

retrieving an executable module;

identifying a first basic block in the executable module located at a first memory location, wherein the first basic block is a code sequence with no branches in except one entry point and with no branches out except one exit point;

determining whether the first basic block is associated with a main program or a library;

in response to determining that the first basic block is associated with a library:

moving a first portion of the executable module that corresponds to the first basic block to a random memory location from the first memory location; and replacing a destination of a first function call to the first basic block within the executable module with a representation of the random memory location by replacing the first function call to the first basic block with a second function call, wherein the first function call is a dynamic call, and wherein the second function call identifies the random memory location;

identifying a second basic block in the executable module located at a second memory location, wherein the second basic block has one entry point and one exit point;

determining whether the second basic block is associated with the main program or a library; and in response to determining that the second basic block is associated with the main program:

leaving a second portion of the executable module that corresponds to the second basic block at the second memory location.

12. The non-transitory computer-readable medium of claim 11, wherein the first memory location and the random memory location are in a same page.

13. The non-transitory computer-readable medium of claim 11, wherein the method further comprises determining whether the first function call to the first basic block is a static call or a dynamic call.

14. The non-transitory computer-readable medium of claim 13, wherein the first function call is a static call, and wherein the representation of the random memory location is an indication of the random memory location.

15. The non-transitory computer-readable medium of claim 11, wherein moving the first portion of the executable module that corresponds to the first basic block to the random memory location comprises inserting a random number of No Operation instructions in the executable module at the one entry point.

\* \* \* \* \*